United States Patent
Zhang et al.

(10) Patent No.: US 11,834,778 B2
(45) Date of Patent: Dec. 5, 2023

(54) MULTIFUNCTIONAL HIGH-STRENGTH COMPOSITE FABRIC COATING AGENT, COATING, METHOD FOR PREPARING THE SAME, AND APPLICATION THEREOF

(71) Applicant: Jiangnan University, Wuxi (CN)

(72) Inventors: Dan Zhang, Wuxi (CN); Chanjuan Huang, Wuxi (CN); Lei Deng, Wuxi (CN); Zhu Long, Wuxi (CN)

(73) Assignee: Jiangnan University, Wuxi (CN)

( * ) Notice: Subject to any disclaimer, the term of this patent is extended or adjusted under 35 U.S.C. 154(b) by 856 days.

(21) Appl. No.: 16/632,385

(22) PCT Filed: Apr. 17, 2018

(86) PCT No.: PCT/CN2018/083416
§ 371 (c)(1),
(2) Date: Jan. 20, 2020

(87) PCT Pub. No.: WO2019/015365
PCT Pub. Date: Jan. 24, 2019

(65) Prior Publication Data
US 2020/0232156 A1    Jul. 23, 2020

(30) Foreign Application Priority Data
Jul. 20, 2017    (CN) .......................... 201710595761.X (51) Int. Cl.
*D06M 15/55*    (2006.01)
*D06M 11/42*    (2006.01)
(Continued)

(52) U.S. Cl.
CPC ............... *D06M 15/55* (2013.01); *C09D 5/14* (2013.01); *C09D 161/06* (2013.01);
(Continued)

(58) Field of Classification Search
CPC .... D06M 11/82; D06M 15/41; D06M 13/513; D06M 11/44; D06M 15/55; D06M 11/74;
(Continued)

(56) References Cited

U.S. PATENT DOCUMENTS

| 7,189,768 | B2 * | 3/2007 | Baran, Jr. ................ C09D 7/62 428/688 |
| 2018/0245279 | A1 * | 8/2018 | Basim Dogan ..... D06M 13/188 |

FOREIGN PATENT DOCUMENTS

CN    105887491 A  *  8/2016    ............ D06M 11/45

OTHER PUBLICATIONS

Espacenet translation of CN-105887491-A (Year: 2016).*

* cited by examiner

*Primary Examiner* — Vishal V Vasisth
(74) *Attorney, Agent, or Firm* — Idea Intellectual Limited; Margaret A. Burke; Sam T. Yip (57) ABSTRACT

A multifunctional high-strength composite fabric coating agent, a coating, a method for preparing the same and an application thereof are provided. The fabric coating agent includes a resin, a reinforcing agent with a reactive group, a bifunctional dispersing agent, a leveling agent, a film forming agent, a softening agent, an antibacterial agent, a solvent, and the like. The reinforcing agent is modified such that it has active functional groups of —OH and $NH_3$. The fabric coating agent is not only easy to apply, fast to react and stabilize, but also suitable for a fabric surface of any material. A treated fabric has high tensile-breaking strength, excellent tearing and bursting performance, good waterproof-and-moisture-permeability and antibacterial performance, and high adhesion. It can be repeatedly knife coated, roll coated, calendared, or dipped. The method is not only mature in technology and low in production cost, but also suitable for large-scale application.

2 Claims, 5 Drawing Sheets

(51) Int. Cl.
| | |
|---|---|
| *D06M 11/46* | (2006.01) |
| *D06M 11/58* | (2006.01) |
| *D06M 11/70* | (2006.01) |
| *D06M 11/74* | (2006.01) |
| *D06M 11/78* | (2006.01) |
| *D06M 15/263* | (2006.01) |
| *D06M 15/41* | (2006.01) |
| *D06M 15/564* | (2006.01) |
| *D06M 15/59* | (2006.01) |
| *D06M 23/10* | (2006.01) |
| *C09D 161/06* | (2006.01) |
| *C09D 175/04* | (2006.01) |
| *C09D 5/14* | (2006.01) |
| *D06M 101/04* | (2006.01) |

(52) U.S. Cl.
CPC ............ *C09D 175/04* (2013.01); *D06M 11/42* (2013.01); *D06M 11/46* (2013.01); *D06M 11/58* (2013.01); *D06M 11/70* (2013.01); *D06M 11/74* (2013.01); *D06M 11/78* (2013.01); *D06M 15/263* (2013.01); *D06M 15/41* (2013.01); *D06M 15/564* (2013.01); *D06M 15/59* (2013.01); *D06M 23/10* (2013.01); *D06M 2101/04* (2013.01)

(58) Field of Classification Search
CPC .... D06M 16/00; D06M 11/42; D06M 15/263; D06M 11/46; D06M 11/70; D06M 11/78; D06M 15/564; D06M 15/59; D06M 23/10; D06M 11/58; D06M 11/13; D06M 2101/32; D06M 2101/28; D06M 2101/06; D06M 2101/12; D06M 2101/04; C09D 5/14; C09D 179/04; C09D 133/00; C09D 175/04; C09D 161/06; C08K 9/06; C08K 9/08; C08K 2003/2227; C08K 5/103; C08K 2003/385; C08K 13/06; C08K 3/38; C08K 2003/2296; C08K 2201/011; C08K 9/04; C08K 3/34; C08K 2003/2248; C08K 3/14; D06N 2209/1671; D06N 2201/042; D06N 2201/06; D06N 3/14; D06N 2209/103; D06N 2201/045; D06N 2209/128; D06N 3/042; D06N 2201/0245; D06P 1/44; C08L 2205/02
See application file for complete search history.

MULTIFUNCTIONAL HIGH-STRENGTH COMPOSITE FABRIC COATING AGENT, COATING, METHOD FOR PREPARING THE SAME, AND APPLICATION THEREOF

CROSS-REFERENCES TO RELATED APPLICATIONS

This application is a 371 application of the International Patent Application No. PCT/CN2018/083416 filed on Apr. 17, 2018, which claims priority from the Chinese patent application No. 201710595761.X filed on Jul. 20, 2017, and the disclosures of which are incorporated herein by reference in their entirety.

FIELD OF THE INVENTION

The present invention relates to a multifunctional high-strength composite fabric coating agent, a multifunctional high-strength composite fabric coating, a method for preparing the same, and an application thereof, belonging to a material technical field.

BACKGROUND OF THE INVENTION

A fabric coating is a kind of polymer compound, which is uniformly coated on a fabric surface. It can form one or more thin films on a fabric surface by adhesion, which not only can improve the appearance and style of the fabric, but also provide the fabric with more functional attributes, such as high strength, waterproof, water resistance, air-and-moisture permeability, fire resistance and antifouling, light shielding and reflection, and the like.

At present, most of the fabrics in the market have low strength. Performing a functional arrangement to a fabric is namely a coating technology, which can meet standard performance requirements of fabrics under specific conditions, yet does not significantly increase costs. However, conventional fabric coatings cannot meet the performance requirements of wear resistance, high strength, waterproof-and-moisture-permeability and the likes of high-end tents, toys, travel bags, express packages and the like.

SUMMARY OF THE INVENTION

The main purpose of the present invention is to provide a multifunctional high-strength composite fabric coating agent, a multifunctional high-strength composite fabric coating, a method for preparing the same, and an application thereof, so as to overcome shortcomings in the prior art.

In order to realize the afore-described purpose of the present invention, the present invention adopts the technical arrangements including:

Embodiments of the present invention provide a multifunctional high-strength composite fabric coating agent including a resin, a reinforcing agent with a reactive group on its surface, a bifunctional dispersing agent, a leveling agent, a film forming agent, a softening agent, an antibacterial agent, a solvent. A mass proportion of the resin, the reinforcing agent with the reactive group on its surface, the bifunctional dispersing agent, the leveling agent, the film forming agent, the softening agent, and the antibacterial agent is 1:0.01-0.6:0.02-0.5:0.02-0.4:0.01-0.3:0.01-0.4:0.01-0.3, and a mass proportion of the solvent and the resin is 100:0.01-50.

Embodiments of the present invention further provide a method for preparing the afore-described multifunctional high-strength composite fabric coating agent, which includes:

A reinforcing agent, a synergist, and a solvent are mixed uniformly in a mass proportion of 1:0.025-2.5:20-50 with reacting at 20-100° C. for 1-10 hours to obtain a reinforcing agent with a reactive group on its surface.

A resin and a solvent are mixed uniformly in a mass proportion of 0.01-50:100 and are stirred for 1-60 minutes at a speed of 200-2000 rpm, so as to obtain a uniform and stable dispersion solution.

The reinforcing agent with the reactive group on its surface, a bifunctional dispersing agent, a leveling agent, a film forming agent, a softening agent, and an antibacterial agent are dispersed uniformly in the dispersion solution according to a mass proportion of 0.01-0.6:0.02-0.5:0.02-0.4:0.01-0.3:0.01-0.4:0.01-0.3, so as to obtain a multifunctional high-strength composite fabric coating agent.

Embodiments of the present invention further provide a multifunctional high-strength composite fabric coating formed from the afore-described multifunctional high-strength composite fabric coating solution.

Embodiments of the present invention further provide a fabric including a fabric base, in which a surface of the fabric base is covered with the multifunctional high-strength composite fabric coating.

Embodiments of the present invention further provide a method for improving performance of a fabric, which includes: covering a fabric surface with the multifunctional high-strength composite fabric coating agent to form a multifunctional high-strength composite fabric coating.

In comparing with the prior art, advantages of the present invention include:

1) A reinforcing agent in a multifunctional high-strength composite fabric coating agent provided by the present invention has reactive groups resulted from a surface modification treatment to the reinforcing agent, such as —OH, —NH$_3$ or the like, which enhances the binding force between the coating and the fabric, thereby greatly improving strength and scratch resistance of the coating;

2) A bifunctional dispersing agent in the multifunctional high-strength composite fabric coating agent provided by the present invention not only provides a dispersing function but also the function of reducing surface tension of the coating, such that the multifunctional high-strength composite fabric coating can more effectively penetrate in between yarns and into micropores of fibers; achieving the effect of that the coating being better combined with the fabric, thus greatly improving the durability of the fabric coating;

3) The multifunctional high-strength composite fabric coating agent provided by the present invention is not only easy to apply, fast to react and stabilize, but also basically suitable for a fabric surface of any material; moreover, a fabric after knife coating, roll coating, calendering, and dipping has high strength, good tearing resistance performance and bursting resistance performance, good durability, high adhesion, and good antibacterial performance and waterproof-and-moisture-permeability performance; yet air permeability performance and softness of the original fabric are not affected, and even being repeatedly knife coated, roll coated, calendared, and dipped; the preparation method thereof is not only technologically mature and low in production cost, but also suitable for large-scale application;

4) The multifunctional high-strength composite fabric coating formed from the multifunctional high-strength composite fabric coating agent provided by the present invention is thin (i.e. about 5-10 μm) and light, yet does not affect the normal use of the coated fabric;

5) The multifunctional high-strength composite fabric coating formed from the multifunctional high-strength composite fabric coating agent provided by the present invention has extremely high strength, and it can be prepared with various colors according to demands and have excellent adhesion; in addition to its usage on fabrics, it can also be used for plastic products, glass, wood, and other base materials, so as to increase strength of the base materials and give the base materials brilliant colors.

DETAILED DESCRIPTION

In view of deficiencies in the prior art, the inventor of the present application provides the technical solutions based on the present invention after a lengthy research and a large number of practices. In the following, the technical arrangements, implementation processes and principle thereof are further explained.

One aspect of the embodiments of the present invention provides a multifunctional high-strength composite fabric coating comprising a resin, a reinforcing agent with a reactive group on its surface, a bifunctional dispersing agent, a leveling agent, a film forming agent, a softening agent, an antibacterial agent, and a solvent. A mass proportion of the resin, the reinforcing agent with the reactive group on its surface, the bifunctional dispersing agent, the leveling agent, the film forming agent, the softening agent, and the antibacterial agent is 1:0.01-0.6:0.02-0.5:0.02-0.4:0.01-0.3: 0.01-0.4:0.01-0.3, and a mass proportion of the solvent and the resin is 100:0.01-50. In some embodiments, a mass proportion of the resin, the reinforcing agent with the reactive group on its surface, the bifunctional dispersing agent, the leveling agent, the film forming agent, the softening agent, and the antibacterial agent is 1:0.01-0.3:0.02-0.4:0.03-0.3:0.01-0.2:0.01-0.4:0.01-0.3, particularly preferred as 1:0.01-0.3:0.05-0.4:0.05-0.3:0.01-0.2:0.02-0.3: 0.01-0.2. When such proportion is adopted, the prepared fabric coating agent has better fluidity, and a corresponding coating has extremely high strength and more durable effect.

In some embodiments, a mass proportion of the solvent and the resin is 100:0.01-50, particularly preferred as 100: 0.05-40. When such proportion is adopted, the prepared fabric coating has better comprehensive properties.

In some embodiments, the reinforcing agent includes nanoparticles, in which each of the nanoparticle has a particle size of 1-200 nm.

Preferably, the nanoparticles include one or more combinations of silicon dioxide, talc, mica powder, aluminum nitride, nano ceramic, titanium boride, titanium carbide, hexagonal boron nitride, black gemstone, nano-silicon carbide, tungsten carbide, titanium nitride, and aluminum oxide, but is not limited thereto.

Preferably, the reactive group includes one or more combinations of —OH, —NH$_3$, —COOH, and epoxy, but is not limited thereto.

In some embodiments, the resin includes one or more combinations of epoxy resin, phenolic resin, polyurethane resin, cyanate ester resin, bismaleimide resin, polyimide resin, organic silicone resin, and acrylic resin, but is not limited thereto.

Preferably, the content of the resin in the multifunctional high-strength composite fabric coating is 0.01-50 wt %.

In some embodiments, the bifunctional dispersing agent includes one or more combinations of triethylhexyl phosphoric acid, sodium dodecyl sulfate, polyacrylamide, Gur gum, fatty acid polyethylene glycol ester, sodium tripolyphosphate, sodium hexametaphosphate, and sodium dodecylbenzene sulfonate, but is not limited thereto. The bifunctional dispersing agent not only provides a dispersing function but also provides functions of reducing surface tension of the coating, such that the multifunctional high-strength composite fabric coating can more effectively penetrate in between yarns and into micropores of fibers, thereby greatly improving the strength of the fabric.

In some embodiments, the leveling agent includes one or more combinations of polyacrylic acid, butyl cellulose, isophorone, octyl triethoxysilane, dodecyl triethoxysilane, isooctyl triethoxysilane, γ-chloropropyl triethoxysilane, γ-mercaptopropyl triethoxysilane, and poly dim ethyl siloxane, but is not limited thereto.

In some embodiments, the film forming agent includes one or more combinations of glycol monopropyl ether, glycol monobutyl ether, dodecanol alcohol ester, chitosan, acrylic resin, polyvinylamine, and dimethyldiallylammonium chloride, but is not limited thereto.

In some embodiments, the softening agent includes one or more combinations of pentaerythritol fatty acid ester, glycerin monofatty acid ester, sorbitan fatty acid ester, fatty acid ethanolamide, hydroxymethyl fatty amide, stearic acid triethanolamine ammonium acetate, N—N-diethylethylenediamine, stearylamine hydrochloride, but is not limited thereto.

In some embodiments, the antibacterial agent includes one or more combinations of nano zinc oxide, nano copper oxide, dihydroamine phosphate, lithium carbonate and nano titanium oxide, but is not limited thereto.

In some embodiments, the solvent includes one or more combinations of deionized water, alcohol, fatty ketone, fatty hydrocarbon and aromatic hydrocarbon, but is not limited thereto.

Preferably, the alcohol includes one or more combinations of ethanol, isopropanol, isoamyl alcohol, n-butanol and glycerol, but is not limited thereto.

Preferably, the fatty ketone includes acetone and/or butanone, but is not limited thereto.

Preferably, the fatty hydrocarbon includes one or more combinations of n-pentane, n-hexane, n-heptane, n-octane and cyclohexane, but is not limited thereto.

Preferably, the aromatic hydrocarbon includes toluene and/or xylene, but is not limited thereto.

Preferably, the coating agent further includes pigment in 1 wt %-2.5 wt %. The pigment can be commercially available.

An another aspect of the embodiments of the present invention provides a method for preparing the afore-described multifunctional high-strength composite fabric coating agent, which includes:

A reinforcing agent, a synergist, and a solvent are mixed uniformly in a mass proportion of 1:0.025-2.5:20-50 and are reacted at 20-100° C. for 1-10 hours to obtain a reinforcing agent with a reactive group on its surface.

A resin and a solvent are mixed uniformly in a mass proportion of 0.01-50:100 to form a uniform and stable dispersion solution.

The reinforcing agent with the reactive group on its surface, a bifunctional dispersing agent, a leveling agent, a film forming agent, a softening agent, and an antibacterial agent are uniformly dispersed in the dispersion solution for 1-30 minutes according to a mass proportion of 0.01-0.6: 0.02-0.5:0.02-0.4:0.01-0.3:0.01-0.4:0.01-0.3, so as to obtain a multifunctional high-strength composite fabric coating.

In some embodiments, the preparation method includes: adding a reinforcing agent, a synergist, and a solvent in a mass proportion of 1:0.025-2.5:20-50 to a reactor and reacting for 1-10 hours at 20-100° C. After reaction products are cooled, solids therein are separated (e.g. through filtration under reduced pressure or the like) and are dried at room temperature for 10-30 hours, Then, milling and screening are performed to obtain a reinforcing agent with a reactive group on its surface.

In some embodiments, the synergist includes a silane coupling agent and/or a polymer compound. Due to performing a surface modification treatment to the reinforcing agent, the reinforcing agent has active functional groups of —OH, —NH$_3$, and the like, and thus binding force between the coating and the fabric is enhanced, thereby greatly improving strength of the coating as compared with the prior art.

Preferably, the silane coupling agent includes one or more combinations of 3-aminopropyltrimethoxysilane, γ-(2,3-epoxypropoxy) propyltriethoxysilane, γ-methylpropenyloxypropyltrimethoxysilane, N—(β-aminoethyl)-γ-aminopropyltriethoxysilane, anilinoisophorone, and γ-aminopropylmethyldiethoxysilane; preferably, the polymer compound includes one or more combinations of polyvinyl alcohol, polyamide, polyacrylic acid, polymethylacrylic acid, polymaleic anhydride and copolymer of fumaric acid(trans-butenedioic acid)-propylene sulfonic acid, but is not limited thereto.

In some embodiments, the preparation method further includes: mixing a resin and a solvent uniformly in a mass proportion of 0.01-50:100, and stirring for 1-60 minutes at a speed of 200-2000 rpm, so as to obtain a uniform and stable dispersion solution.

In some embodiments, the preparation method further includes: adding a reinforcing agent with a reactive group on its surface, a leveling agent, a bifunctional dispersing agent, a film-forming agent, a softening agent, and an antibacterial agent into the dispersion solution, and then stirring in a high-speed for 1-30 minutes to obtain the stable dispersion solution, namely as the multifunctional high-strength composite fabric coating agent.

Further, in some of more specific embodiments, the preparation method includes:

A reinforcing agent, a synergist, and a solvent are added into a reactor in a mass proportion of 1:0.025-1.5:20-50 and are reacted for 1-10 hours at 20-100° C. After reaction products are cooled, the reaction products are filtrated under reduced pressure and are dried at room temperature for 10-30 hours. Then, milling and screening are performed to obtain a reinforcing agent with active functional groups of —OH, —NH$_3$, and the like on its surface.

(2) A resin and a solvent are mixed at a weight ratio of 0.01-50:100 to form a mixture, and then the mixture is stirred for 1-60 minutes in a range of 200-2000 rpm by magnetic stirring.

(3) The reinforcing agent with the active functional groups on its surface, a bifunctional dispersing agent, a leveling agent, a film forming agent, a softening agent, and an antibacterial agent are added into the dispersion solution prepared in the step (2) in a proportion of 1:0.01-0.6:0.02-0.5:0.02-0.4:0.01-0.3:0.01-0.4:0.01-0.3 to the resin, and then stripping at a high-speed for 1-30 minutes is performed to obtain the stable dispersion solution, namely as the multifunctional high-strength composite fabric coating agent.

An another aspect of the embodiments of the present invention further provides a multifunctional high-strength composite fabric coating formed from the afore-described multifunctional high-strength composite fabric coating solution. Preferably, the thickness of the coating is in a range of 5-10 μm.

An another aspect of the embodiments of the present invention further provides a modified fabric including a fabric base, in which a surface of the fabric base is covered with the multifunctional high-strength composite fabric coating.

Preferably, the tensile breaking strength of the fabric is more than 80% higher than that of the fabric base (i.e. the fabric before the modification), the tearing strength is more than 80% higher than that of the fabric base, and the bursting strength is more than 80% higher than that of the fabric base. Moreover, the modified fabric still maintains the soft and air-permeability as the fabric before the modification, and the modified fabric also has good waterproof-and-moisture-permeability performance and antibacterial performance.

Further, the fabric base includes any one of knitted fabric, woven fabric, non-woven fabric, and the like; preferably, the woven fabric includes plain, twill, satin fabric, or the like, but is not limited thereto.

Further, the fabric base includes any one of natural fiber fabric, chemical fiber fabric, blended fabrics of them, and the like; preferably, the natural fiber fabric includes any one or blended fabric combinations of cotton fabric, hemp fabric, wool fabric and silk fabric; preferably, the chemical fiber fabric includes any one or blended fabric combinations of polyester fabric, acrylic fabric, nylon fabric, and the like, but is not limited thereto.

An another aspect of the embodiments of the present invention further provides a method for improving performance of a fabric, which includes: covering a fabric surface with a multifunctional high-strength composite fabric coating agent to form a multifunctional high-strength composite fabric coating.

Preferably, the fabric surface can be covered with the multifunctional high-strength composite fabric coating agent at least by any one approach of knife coating, roll coating, calendering, and dipping.

The multifunctional high-strength composite fabric coating agent provided by the present invention is not only easy to apply, fast to react and stabilize, but also basically suitable for a fabric surface of any material. Moreover, a fabric after knife coating, roll coating, calendering, or dipping has high tensile breaking strength, excellent bursting strength performance, excellent tearing strength performance, good waterproof-and-moisture-permeability performance and antibacterial performance, and high adhesion, and even when being repeatedly knife coated, roll coated, calendared, or dipped; the preparation method thereof is not only technologically mature and low in production cost, but also suitable for large-scale application.

The technical arrangements of the present invention are further explained in combination with the drawings and some embodiments, but the present invention is not limited to. However, it should be understood that within the scope of the present invention, the above technical features of the present invention and the technical features described in the following (as being within embodiments) can be combined with each other to form a new or preferred technical arrangements. Herein, in view of the space limitations, it is no longer one by one to describe.

In the testing methods described as the following embodiments, if there is no special description, the methods are conventional; for the reagents and materials, if there is no special description, they can be obtained commercially.

Embodiment 1

(1) 9 g nano tungsten carbide (with particle size about 200 nm), 22.5 g 3-aminopropyltrimethoxysilane and 450 g ethanol are added to a reactor to react at 100° C. for 10 hours. After reaction products are cooled, the products are filtrated under reduced pressure and are dried at room temperature for 30 hours.

Then, milling and screening are performed to finally obtain nano tungsten carbide with a large amount of —NH$_3$ on its surface.

(2) 15 g polyurethane resin and 30 g xylene are respectively weighed in a 250 ml beaker, and a magnetic stirrer is used to stir them in 1500 rpm for 40 minutes.

(3) 9 g nano tungsten carbide with a large amount of —NH$_3$ on its surface, 7.5 g isophorone, 6 g sodium dodecyl sulfate, 4.5 g dodecyl alcohol ester, 6 g pentaerythritol fatty acid ester, 4.5 g nano zinc oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent. In the present step, trace pigments, such as red, green pigments or the like, can further be added to the coating agent.

Figure 1A:
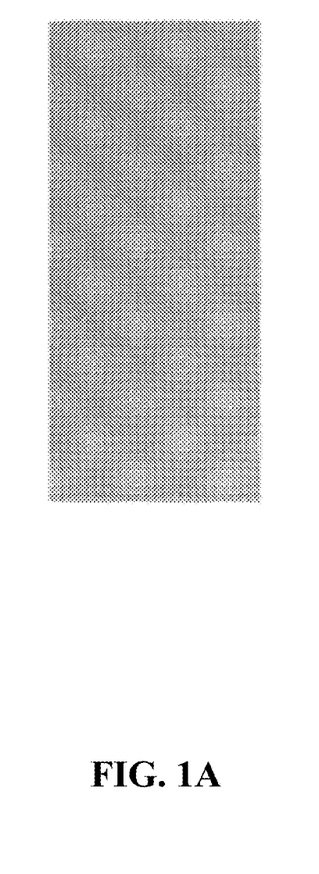
FIGS. 1A-1C show coating effects of pure color, green, and red coating agents on white cotton cloths, respectively, according to an embodiment 1.
Figure 1B:
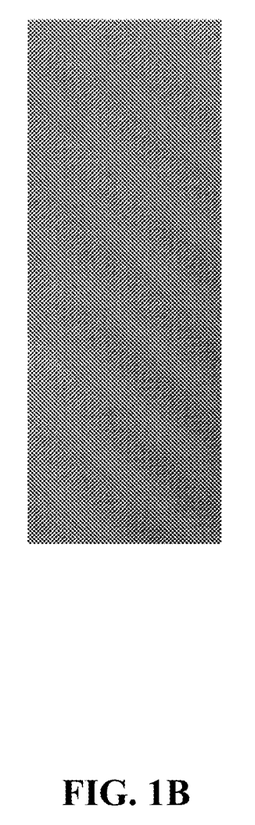
Figure 1C:
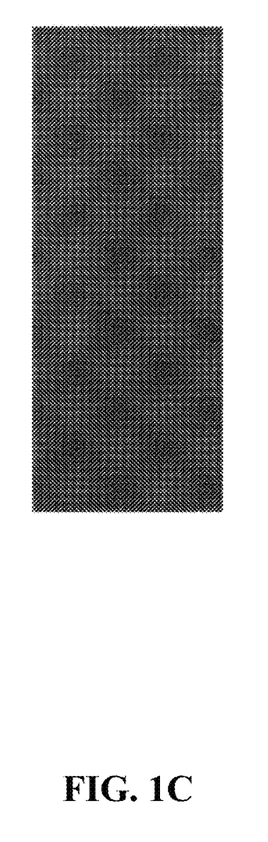

(4) A cleaned cotton plain fabric is taken and an approach of knife coating, roll coating, calendering, or dipping is performed to make the coating agent adhere to the fabric surface. After half an hour, the fabric is put into an oven at 100° C. for drying for 30 minutes, so as to form a coating on the fabric surface. FIGS. 1A-FIG. 1C show coating effects of pure color, green, and red coating agents on white cotton cloths, respectively.

(5) After the testing, the tensile breaking strength of the fabric with the coating which is obtained from the present embodiment is 90% higher than that of the original fabric, the bursting strength is 95% higher than that of the original fabric, the tearing strength is 90% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the testing, the coating amount to the cotton is 35 g/m$^2$, and the coating amount to the polyester is 15 g/m$^2$. The wear resistance of the cotton coated by an approach of the present invention is 2094 times, and the wear rate is 1.2% at 1500 times. The wear resistant times of the polyester is 4334 times, and the wear rate is 1.2% at 3000 times. The contact angle of the uncoated cotton is 0°; the contact angle of the uncoated polyester is 90.2°, the contact angle of the cotton coated by an approach of the present invention is 120.7°, and the contact angle of the polyester coated by an approach of the present invention is 135.4°.

Embodiment 2

(1) 2 g black gemstone (with particle size about 50 nm), 0.5 g polyacrylic acid and 90 g deionized water are added to a reactor to react at 60° C. for 2 hours. After reaction products are cooled, the products are filtrated under reduced pressure and are dried at room temperature for 14 hours. Then, milling and screening are performed to finally obtain black gemstone with a large amount of —COOH on its surface.

(2) 20 g polyacrylic resin, 50 g n-butanol, and 50 g xylene are respectively weighed in a 250 ml beaker, and a magnetic stirrer is used to stir them in 1500 rpm for 45 minutes.

(3) 2 g black gemstone with a large amount of —COOH on its surface, 0.3 g octyl triethoxysilane, 0.20 g polyacrylamide, 0.15 g ethylene glycol monopropyl ether, 3 g triethanolamine stearate ammonium acetate, 1 g nano copper oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent. In the present step, trace pigments, such as red, green pigments, or the like, can further be added to the coating agent.

Figure 2:
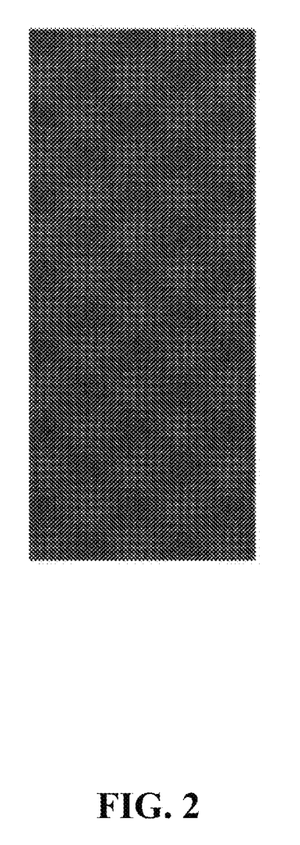
FIG. 2 shows a coating effect of a coating agent on a pink cloth according to an embodiment 2.

(4) A cleaned polyester twill fabric is taken and an approach of knife coating, roll coating, calendering, or dipping is performed to make the coating agent adhere to the fabric surface. After 40 minutes, the fabric is put into an oven at 90° C. for drying for 30 minutes, so as to form a coating. FIG. 2 shows a coating effect of a brown black coating agent on a pink cotton cloth.

(5) After testing, the tensile breaking strength of the fabric with the coating which is obtained from the present embodiment is 90% higher than that of the original fabric, the bursting strength is 90% higher than that of the original fabric, the tearing strength is 90% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1992 times, and the wear rate is 1.4% at 1500 times. The wear resistant times of the polyester is 4256 times, and the wear rate is 1.3% at 3000 times. The contact angle of the uncoated cotton is 0°; the contact angle of the uncoated polyester is 90.2°, the contact angle of the cotton coated by an approach of the present invention is 113.4°, and the contact angle of the polyester coated by an approach of the present invention is 128.6°.

Embodiment 3

(1) 4 g hexagonal boron nitride (with particle size about 70 nm), 0.5 g N-(β-aminoethyl)-γ-aminopropyl triethoxysilane, 0.5 g polyvinyl alcohol, and 90 g deionized water are added to a reactor to react at 50° C. for 4 hours. After reaction products are cooled, the products are filtrated under reduced pressure and are dried at room temperature for 22 hours. Then, milling and screening are performed to finally obtain hexagonal boron nitride with a large amount of —OH and —NH$_3$ on its surface.

(2) 25 g of phenolic resin, 20 g of ethanol, and 80 g of xylene are respectively weighed in a 250 ml beaker, and a magnetic stirrer is used to stir them in 1800 rpm for 45 mins.

(3) 3 g hexagonal boron nitride with a large amount of —OH and —NH$_3$ on its surface, 0.5 g octyltriethoxysilane, 0.15 g sodium twelve alkyl sulfate, 0.20 g glycol monobutyl ether, 3 g fatty acid ethanolamide, and 2 g nano zinc oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent. In the present step, trace pigments, such as red, green pigments or the like, can further be added to the coating agent.

Figure 3:
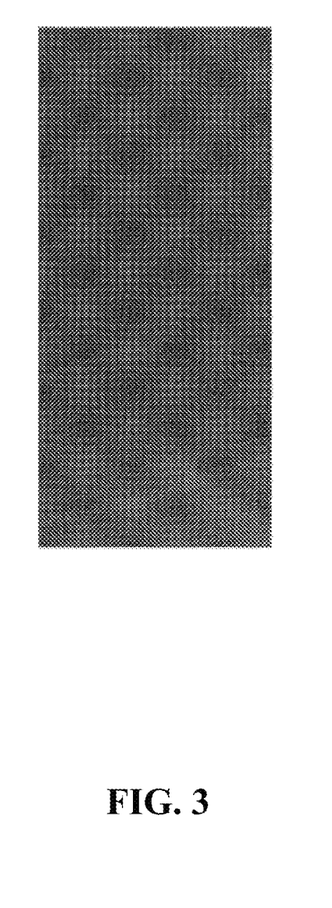
FIG. 3 shows a coating effect of a coating agent on a pink cloth according to an embodiment 3.

(4) A cleaned fabric is taken and an approach of knife coating, roll coating, calendering, or dipping is performed to make the coating agent adhere to the fabric surface. After 30 minutes, the fabric is put into an oven at 120° C. for drying for 60 minutes, so as to form a coating. FIG. 3 shows a coating effect of a purple red coating agent on a pink cotton cloth (5) After testing, the tensile breaking strength of the fabric with the coating which is obtained from the present embodiment is 85% higher than that of the original fabric, the bursting strength is 80% higher than that of the original fabric, the tearing strength is 80% higher than that of the original fabric. The fabric is slightly stiff and has antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1801 times, and the wear rate is 1.7% at 1500 times. The wear resistant times of the polyester is 3879 times, and the wear rate is 1.6% at 3000 times. The contact angle of the uncoated cotton is 0°; the contact angle of the uncoated polyester is 90.2°, the contact angle of the cotton coated by an approach of the present invention is 102.6°, and the contact angle of the polyester coated by an approach of the present invention is 110.7°.

Embodiment 4

(1) 0.6 g titanium nitride (with particle size about 100 nm), 0.6 g black gemstone (with particle size about 50 nm), 0.5 g γ-(2,3-epoxypropoxy) propyltriethoxysilane and 90 g of n-heptane are added to a reactor to react at 70° C. for 6 hours. After reaction products are cooled, the products are filtrated under reduced pressure and are dried at room temperature for 18 hours. Then, milling and screening are performed to finally obtain titanium nitride and black gemstone with a large amount of epoxy groups on their surfaces.

(2) 25 g polyurethane resin, 50 g n-butanol, and 50 g n-octane are respectively weighed in a 250 ml beaker, and a magnetic stirrer is used to stir them in 1600 rpm for 45 minutes.

(3) 0.60 g titanium nitride with a large amount of epoxy groups on its surface, 0.60 g black gemstone with a large amount of epoxy groups on its surface, 0.30 g γ-mercaptopropyl triethoxysilane, 0.3 g sodium dodecyl sulfate, 0.15 g acrylic resin, 4 g hydroxymethylfatty amide, and 3 g nano zinc oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent.

(4) A cleaned corduroy fabric is taken and an approach of knife coating, roll coating, calendering, or dipping is performed to make the coating agent adhere to the fabric surface. After 40 minutes, the fabric is put into an oven at 105° C. for drying for 30 minutes, so as to form a coating.

(5) After testing, the tensile breaking strength of the fabric with the coating which is obtained from the present embodiment is 90% higher than that of the original fabric, the bursting strength is 95% higher than that of the original fabric, the tearing strength is 90% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 2278 times, and the wear rate is 1.0% at 1500 times. The wear resistant times of the polyester is 4567 times, and the wear rate is 1.3% at 3000 times. The contact angle of the uncoated cotton is 0°; the contact angle of the uncoated polyester is 90.2°, the contact angle of the cotton coated by an approach of the present invention is 114.8°, and the contact angle of the polyester coated by an approach of the present invention is 125.9°.

Embodiment 5

(1) 2.2 g silicon carbide (with particle size of about 90 nm), 0.5 g N—(β-aminoethyl)-γ-aminopropyl triethoxysilane, and 90 g n-heptane are added to a reactor to react at 60° C. for 7 hours. After reaction products are cooled, the products are filtrated under reduced pressure and are dried at room temperature for 13 hours. Then, milling and screening are performed to finally obtain silicon carbide with a large amount of —NH$_3$ on its surface.

(2) 17 g polyacrylic acid resin, 50 g n-hexanen, and 50 g xylene are respectively weighed in a 250 ml beaker, and a magnetic stirrer is used to stir them in 1600 rpm for 40 minutes.

(3) 2.20 g silicon carbide with a large amount of —NH$_3$ on its surface, 0.20 g isophorone, 0.10 g sodium dodecyl sulfate, 0.30 g dodecyl alcohol ester, 2 g of sorbitan fatty acid ester, and 4 g lithium carbonate are added to the dispersion solution prepared in the step (2), and then a magnetic stirrer is used to stir them in 2000 rpm for 20 minutes to obtain the stable dispersion solution, namely as the multifunctional high-strength composite fabric coating agent.

(4) A cleaned cashmere/cotton blended fabric is taken and an approach of knife coating, roll coating, calendering, or dipping is performed to make the coating agent adhere to the fabric surface. After 50 minutes, the fabric is put into an oven at 90° C. for drying for 50 minutes, so as to form a coating.

(5) After testing, the tensile breaking strength of the fabric with the coating which is obtained from the present embodiment is 100% higher than that of the original fabric, the bursting strength is 95% higher than that of the original fabric, the tearing strength is 100% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 2485 times, and the wear rate is 0.9% at 1500 times. The wear resistant times of the polyester is 4690 times, and the wear rate is 1.1% at 3000 times. The contact angle of the uncoated cotton is 0°; the contact angle of the uncoated polyester is 90.2°, the contact angle of the cotton coated by an approach of the present invention is 130.6°, and the contact angle of the polyester coated by an approach of the present invention is 130.4°.

Embodiment 6

(1) 2.1 g titanium carbide (with particle size about 50 nm), 2 g titanium borate (with particle size about 50 nm), 0.5 g fumaric acid, 0.5 g polyamide, and 90 g of deionized water are added to a reactor to react at 80° C. for 7 hours. After reaction products are cooled, the products are filtrated under reduced pressure and are dried at room temperature for 16 hours. Then, milling and screening are performed to finally obtain titanium carbide and titanium borate with a large amount of —NH$_3$ and —COOH on their surfaces.

(2) 20 g cyanate resin, 45 g cyclohexane, and 55 g xylene are respectively weighed in a 250 ml beaker, and a magnetic stirrer is used to stir them in 1500 rpm for 60 minutes to obtain a well dispersed solution.

(3) 2.1 g titanium carbide with a large amount of —NH$_3$ and —COOH on its surface, 2 g titanium borate with a large amount of —NH$_3$ and —COOH on its surface, 0.25 g isophorone, 0.25 g sodium dodecyl sulfate, 0.20 g dodecyl alcohol ester, 3 g stearamide hydrochloride, and 2 g nano copper oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent.

(4) A cleaned wool/silk blended fabric is taken and an approach of knife coating, roll coating, calendering, or dipping is performed to make the coating agent adhere to the fabric surface. After 30 minutes, the fabric is put into an oven at 80° C. for drying for 30 minutes, so as to form a coating.

(5) After testing, the tensile breaking strength of the fabric with the coating which is obtained from the present embodiment is 80% higher than that of the original fabric, the bursting strength is 85% higher than that of the original fabric, the tearing strength is 90% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 2109 times, and the wear rate is 1.1% at 1500 times. The wear resistant times of the polyester is 4205 times, and the wear rate is 1.2% at 3000 times. The contact angle of the uncoated cotton is 0°; the contact angle of the uncoated polyester is 90.2°, the contact angle of the cotton coated by an approach of the present invention is 119.2°, and the contact angle of the polyester coated by an approach of the present invention is 126.3°.

Embodiment 7

(1) 1 g nano silicon carbide (with particle size about 110 nm), 0.5 g polyvinyl alcohol, 0.5 g N-(β-aminoethyl)-γ-aminopropyl triethoxysilane, and 90 g deionized water are added to a reactor to react at 40° C. for 2 hours. After reaction products are cooled, the products are filtrated under reduced pressure and are dried at room temperature for 12 hours. Then, milling and screening are performed to finally obtain nano silicon carbide with a large amount of —NH$_3$ and —COOH on its surface.

(2) 25 g phenolic resin, 60 g n-butanol, and 40 g of xylene are respectively weighed in a 250 ml beaker, and a magnetic stirrer is used to stir them in 1600 rpm for 40 minutes.

(3) 1 g nano silicon carbide with a large amount of —NH$_3$ and —COOH on its surface, 0.20 g γ-mercaptopropyl triethoxysilane, 0.20 g sodium dodecyl sulfate, 0.30 g glycol monobutyl ether, 0.5 g fatty acid ethanolamide, and 0.8 g nano titanium oxide are added to the dispersion solution prepared in the step (2), and then a magnetic stirrer is used to stir them in 2000 rpm for 20 minutes to obtain the stable dispersion solution, namely as the multifunctional high-strength composite fabric coating agent.

(4) A cleaned acrylic twill fabric is taken and an approach of knife coating, roll coating, calendering, or dipping is performed to make the coating agent adhere to the fabric surface. After 40 minutes, the fabric is put into an oven at 60° C. for drying for 30 minutes, so as to form a coating.

(5) After testing, the tensile breaking strength of the fabric with the coating which is obtained from the present embodiment is 100% higher than that of the original fabric, the bursting strength is 85% higher than that of the original fabric, the tearing strength is 95% higher than that of the original fabric. The fabric is soft and has certain antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 2203 times, and the wear rate is 1.1% at 1500 times. The wear resistant times of the polyester is 4193 times, and the wear rate is 1.2% at 3000 times. The contact angle of the uncoated cotton is 0°; the contact angle of the uncoated polyester is 90.2°, the contact angle of the cotton coated by an approach of the present invention is 118.5°, and the contact angle of the polyester coated by an approach of the present invention is 125.9°.

Reference Example 1

(1) 10 g polyacrylic resin, 10 g organosilicon resin, 50 g n-butanol, and 50 g xylene are respectively weighed in a 250 ml beaker, and a magnetic stirrer is used to stir them in 1500 rpm for 45 minutes;

(2) 2 g black gemstone (with particle size of about 50 nm), 0.3 g octyl triethoxysilane, 0.20 g polyacrylamide, 0.15 g ethylene glycol monopropyl ether, 1.8 g N—N-diethylenediamine, and 2 g nano zinc oxide are added to the dispersion solution prepared in the step (1), and then a magnetic stirrer is used to stir them in 2000 rpm for 20 minutes to obtain the stable dispersion solution, namely as the fabric coating agent.

(3) A cleaned polyester plain fabric is taken and an approach of knife coating, roll coating, calendering, or dipping is performed to make the coating agent adhere to the fabric surface. After 40 minutes, the fabric is put into an oven at 90° C. for drying for 30 minutes, so as to form a coating.

(4) After testing, the tensile breaking strength of the fabric with the coating which is obtained from the present reference is 30% higher than that of the original fabric, the bursting strength is 35% higher than that of the original fabric, the tearing strength is 40% higher than that of the original fabric. The fabric is hard and has weak antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1003 times, and the wear rate is 5.5% at 1500 times. The wear resistant times of the polyester is 1193 times, and the wear rate is 6.2% at 3000 times. The contact angle of the uncoated cotton is 0°; the contact angle of the uncoated polyester is 90.2°, the contact angle of the cotton coated by an approach of the present invention is 45.7°, and the contact angle of the polyester coated by an approach of the present invention is 74.1°.

Reference Example 2

(1) 15 g phenolic resin, 10 g epoxy resin, 20 g ethanol, and 80 g xylene respectively are weighed in a 250 ml beaker, and a magnetic stirrer is used to stir them in 1800 rpm for 45 minutes;

(2) 0.5 g octyl triethoxysilane, 0.15 g sodium dodecyl sulfate, 0.20 g glycol monobutyl ether, 1.5 g fatty acid ethanolamide, and 2.8 g nano titanium oxide are added to the dispersion solution prepared in the step (1), and then a magnetic stirrer is used to stir them in 2000 rpm for 20 minutes to obtain the stable dispersion solution, namely as the fabric coating agent.

(3) A cleaned polyester-cotton blend twill fabric is taken and an approach of knife coating, roll coating, calendering, or dipping is performed to make the coating agent adhere to the fabric surface. After 30 minutes, the fabric is put into an oven at 120° C. for drying for 60 minutes, so as to form a coating.

(4) After testing, the tensile breaking strength of the fabric with the coating which is obtained from the present reference is 40% higher than that of the original fabric, the bursting strength is 55% higher than that of the original fabric, the tearing strength is 30% higher than that of the original fabric. The fabric is soft and has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1128 times, and the wear rate is 4.9% at 1500 times. The wear resistant times of the polyester is 1395 times, and the wear rate is 5.7% at 3000 times. The contact angle of the uncoated cotton is 0°; the contact angle of the uncoated polyester is 90.2°, the contact angle of the cotton coated by an approach of the present invention is 52.1°, and the contact angle of the polyester coated by an approach of the present invention is 80.3°.

Reference Example 3

(1) 2.2 g titanium carbide (with particle size of about 90 nm), 0.5 g N-(β-aminoethyl)-γ-aminopropyl triethoxysilane, and 90 g n-heptane are added to a reactor to react at 60° C. for 7 hours. After reaction products are cooled, the products are filtrated under reduced pressure and are dried at room temperature for 13 hours. Then, milling and screening are performed to finally obtain titanium carbide with a large amount of —NH$_3$ on its surface.

(2) 10 g polyacrylic acid resin, 7 g epoxy resin, 50 g n-hexane, and 50 g of xylene are respectively weighed in a 250 ml beaker, and a magnetic stirrer is used to stir them in 1600 rpm for 40 minutes.

(3) 2.20 g titanium carbide, 0.20 g isophorone, 0.10 g sodium dodecyl sulfate, 2 g sorbitan fatty acid ester, and 2 g lithium carbonate are added to the dispersion solution prepared in the step (2), and then a magnetic stirrer is used to stir them in 2000 rpm for 20 minutes to obtain the stable dispersion solution, namely as the fabric coating agent.

(4) A cleaned nylon twill fabric is taken and an approach of knife coating, roll coating, calendering, or dipping is performed to make the coating agent adhere to the fabric surface. After 50 minutes, the fabric is put into an oven at 90° C. for drying for 50 minutes, so as to form a coating.

(5) After testing, the tensile breaking strength of the fabric with the coating which is obtained from the present embodiment is 40% higher than that of the original fabric, the bursting strength is 45% higher than that of the original fabric, the tearing strength is 50% higher than that of the original fabric. The fabric is soft and has certain antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1263 times, and the wear rate is 3.7% at 1500 times. The wear resistant times of the polyester is 2106 times, and the wear rate is 5.1% at 3000 times. The contact angle of the uncoated cotton is 0°; the contact angle of the uncoated polyester is 90.2°, the contact angle of the cotton coated by an approach of the present invention is 60.5°, and the contact angle of the polyester coated by an approach of the present invention is 89.8°.

Reference Example 4

(1) 1 g nano silicon carbide (with particle size about 60 nm), 0.5 g polyvinyl alcohol, 0.5 g N-(β-aminoethyl)-γ-aminopropyl triethoxysilane, and 90 g deionized water are added to a reactor to react at 40° C. for 2 hours. After reaction products are cooled, the products are filtrated under reduced pressure and are dried at room temperature for 12 hours. Then, milling and screening are performed to finally obtain nano silicon carbide with a large amount of —NH$_3$ and —COOH on its surface.

(2) 17 g phenolic resin, 8 g silicone resin, 60 g n-butanol, and 40 g xylene are respectively weighed in a 250 ml beaker, and a magnetic stirrer is used to stir them in 1600 rpm for 40 minutes.

(3) 1 g nano silicon carbide with a large amount of —NH$_3$ and —COOH on its surface, 0.20 g γ-mercaptopropyl triethoxysilane, 0.30 g glycol monobutyl ether, 2 g hydroxymethylfatty amide, and 1 g nano zinc oxide are added to the dispersion solution prepared in the step (2), and then a magnetic stirrer is used to stir them in 2000 rpm for 20 minutes to obtain the stable dispersion solution, namely as the fabric coating agent.

(4) A cleaned cotton plain fabric is taken and an approach of knife coating, roll coating, calendering, or dipping is performed to make the coating agent adhere to the fabric surface. After 40 minutes, the fabric is put into an oven at 60° C. for drying for 30 minutes, so as to form a coating.

(5) After testing, the tensile breaking strength of the fabric with the coating which is obtained from the present embodiment is 65% higher than that of the original fabric, the bursting strength is 45% higher than that of the original fabric, the tearing strength is 50% higher than that of the original fabric. The fabric is soft and has certain antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1478 times, and the wear rate is 2.9% at 1500 times. The wear resistant times of the polyester is 2234 times, and the wear rate is 3.9% at 3000 times. The contact angle of the uncoated cotton is 0°; the contact angle of the uncoated polyester is 90.2°, the contact angle of the cotton coated by an approach of the present invention is 65.2°, and the contact angle of the polyester coated by an approach of the present invention is 90.2°.

Reference Example 5

(1) 2.2 g silicon carbide (with particle size about 80 nm), 0.5 g N—(β-aminoethyl)-γ-aminopropyl triethoxysilane and 90 g n-heptaneare added to a reactor to react at 60° C. for 7 hours. After reaction products are cooled, the products are filtrated under reduced pressure and are dried at room temperature for 13 hours. Then, milling and screening are performed to finally obtain silicon carbide with a large amount of —NH$_3$ on its surface.

(2) 17 g polyacrylic acid resin, 50 g n-hexane, and 50 g xylene are respectively weighed in a 250 ml beaker, and a magnetic stirrer is used to stir them in 1600 rpm for 40 minutes.

(3) 2.20 g obtain silicon carbide with a large amount of —NH$_3$ on its surface, 0.20 g of isophorone, 0.10 g of sodium dodecyl sulfate, 0.30 g of dodecyl alcohol ester, and 4 g of lithium carbonate are added to the dispersion solution prepared in the step (2), and then a magnetic stirrer is used to stir them in 2000 rpm for 20 minutes to obtain the stable dispersion solution, namely as the fabric coating agent.

(4) A cleaned cashmere/cotton blended fabric is taken and an approach of knife coating, roll coating, calendering, or dipping is performed to make the coating agent adhere to the fabric surface. After 50 minutes, the fabric is put into an oven at 100° C. for drying for 50 minutes, so as to form a coating.

(5) After testing, the tensile breaking strength of the fabric with the coating which is obtained from the present embodiment is 90% higher than that of the original fabric, the bursting strength is 85% higher than that of the original fabric, the tearing strength is 80% higher than that of the original fabric. The feeling to the fabric is particularly hard and the fabric has good antibacterial performance as well as waterproof-and-moisture-permeability performance.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/m$^2$, and the coating amount to the polyester is 15 g/m$^2$. The wear resistance of the cotton coated by an approach of the present invention is 1590 times, and the wear rate is 2.5% at 1500 times. The wear resistant times of the polyester is 2769 times, and the wear rate is 2.8% at 3000 times. The contact angle of the uncoated cotton is 0°; the contact angle of the uncoated polyester is 90.2°, the contact angle of the cotton coated by an approach of the present invention is 78.9°, and the contact angle of the polyester coated by an approach of the present invention is 93.1°.

Reference Example 6

(1) 2.1 g titanium carbide (with particle size about 80 nm), 2 g titanium borate (with particle size about 50 nm), 0.5 g fumaric acid, 0.5 g polyamide, and 90 g deionized water are added to a reactor to react at 80° C. for 7 hours. After reaction products are cooled, the products are filtrated under reduced pressure and are dried at room temperature for 16 hours. Then, milling and screening are performed to finally obtain titanium carbide and titanium borate with a large amount of —$NH_3$ and —COOH on their surfaces.

(2) 20 g cyanate resin, 45 g cyclohexane, and 55 g xylene are respectively weighed in a 250 ml beaker, and a magnetic stirrer is used to stir them in 1500 rpm for 60 minutes.

(3) 2.1 g titanium carbide with a large amount of —$NH_3$ and —COOH on its surface, 2 g titanium borate with a large amount of —$NH_3$ and —COOH on its surface, 0.25 g isophorone, 0.25 g of sodium dodecyl sulfate, 0.20 g dodecyl alcohol ester, and 3 g stearamide hydrochloride are added to the dispersion solution prepared in the step (2), and then a magnetic stirrer is used to stir them in 2000 rpm for 20 minutes to obtain the stable dispersion solution, namely as the fabric coating agent.

(4) A cleaned wool/silk blended fabric is taken and an approach of knife coating, roll coating, calendering, or dipping is performed to make the coating agent adhere to the fabric surface. After 30 minutes, the fabric is put into an oven at 80° C. for drying for 30 minutes, so as to form a coating.

(5) After testing, the tensile breaking strength of the fabric with the coating which is obtained from the present embodiment is 70% higher than that of the original fabric, the bursting strength is 65% higher than that of the original fabric, the tearing strength is 70% higher than that of the original fabric. The fabric is soft and has bad antibacterial.

Wear resistance and contact angle of the fabric with the coating of the present invention are tested. Times of the wear resistance are determined by a Taber-type fabric abrasion tester, and the contact angle is determined by an AS100 droplet shape analyzer. Cotton and polyester materials are taken as examples, the wear resistance of the uncoated cotton is 20 times, and the wear rate is 0.8%. During the test, the coating amount to the cotton is 35 g/$m^2$, and the coating amount to the polyester is 15 g/$m^2$. The wear resistance of the cotton coated by an approach of the present invention is 1609 times, and the wear rate is 2.1% at 1500 times. The wear resistant times of the polyester is 2732 times, and the wear rate is 2.7% at 3000 times. The contact angle of the uncoated cotton is 0°; the contact angle of the uncoated polyester is 90.2°, the contact angle of the cotton coated by an approach of the present invention is 83.5°, and the contact angle of the polyester coated by an approach of the present invention is 92.7°.

In view of embodiments 1-7, it can be found that the multifunctional high-strength composite fabric coating agent obtained according to the technical arrangements of the present invention is not only easy to apply, fast to react and stabilize, but also basically suitable for a fabric surface of any material. Moreover, a fabric after knife coating, roll coating, calendering, or dipping has extremely high strength, excellent tearing resistance performance, and good bursting performance, good durability, high adhesion, even when being repeatedly knife coated, roll coated, calendared, or dipped; the preparation method thereof is not only technologically mature and low in production cost, but also suitable for large-scale application.

Furthermore, the inventor of the present disclosure further conducts tests with other materials and conditions listed in the present disclosure as referring to the methods of the embodiments 1-7. For example, phenolic, polyurethane, silicone, and polyacrylic resins in embodiments 1-7 are replaced by bismaleic ammonium sulfite resin; titanium borate, titanium carbide, blackstone, nano silicon carbide, tungsten carbide, and titanium nitride in embodiments 1-7 are replaced by talcum powder, mica powder, and aluminum oxide; sodium dodecyl sulfate, and polyacrylamide in embodiments 1-7 are replaced by triethylhexyl phosphate gum, fatty acid polyethylene glycol ester, sodium tripolyphosphate, sodium hexametaphosphate and, sodium dodecylbenzene sulfonate; 3-aminopropyltrimethoxysilane, γ-(2,3-epoxypropoxy)propyltriethoxysilane, N-(β-aminoethyl)-γ-aminopropyltriethoxysilane, polyvinyl alcohol, polyamide, and polyacrylic acid in embodiments 1-7 are replaced by γ-methylpropenyloxypropyltrimethoxysilane, anilinophenone, γ-aminopropylmethyldiethoxysilane, polymethylacrylic acid, polymaleic anhydride, and copolymer of fumaric acid and propylene sulfonic acid; isophorone, octyltriethoxysilane, γ-mercaptopropyltriethoxysilane in embodiments 1-7 are replaced by polyacrylic acid, butyl cellulose, dodecyltriethoxysilane, isooctyltriethoxysilane, γ-chloropropyltriethoxysilane, and polydimethylsiloxane; glycol monopropyl ether, glycol monobutyl ether, dodecyl alcohol ester, and acrylic resin in embodiments 1-7 are replaced by chitosan, polyvinylamine, and dimethyldiallylammonium chloride; and deionized water, ethanol, n-butanol, n-hexane, n-heptane, n-octane, cyclohexanen and xylene in embodiments 1-7 are replaced by isopropanol, isoamyl alcohol, glycerol, acetone, butanone, and n-pentane, toluene. The results show that the fabric coating is still easy to apply, fast to react and stabilize. Also, the fabric coating can be applied such that a fabric after knife coating, roll coating, calendering, or dipping has excellent tearing performance and bursting performance, extremely high strength, good durability, and high adhesion.

It should be understood that the above described embodiments are only some of the present invention. For one skilled in the art, other deformations and improvements can be made without departing from the inventive concept of the present invention, which belong to the protection scope of the present invention.

What is claimed is:

1. A method for preparing a modified fabric using a multifunctional high-strength composite fabric coating agent, comprising:
   covering a fabric base with a multifunctional high-strength composite fabric coating agent to form a multifunctional high-strength composite fabric coating and obtain a modified fabric;
   wherein the thickness of the coating is in a range of 5-10 μm and the modified fabric has a waterproof-and-moisture-permeability, an antibacterial effect, a high adhesion ability, a tensile breaking strength 80% higher than that of the fabric base, a bursting strength 80% higher than that of the fabric base, and a tearing strength 80% higher than that of the fabric base;
wherein the multifunctional high-strength composite fabric coating agent is prepared by:
mixing a reinforcing agent, a synergist, and a solvent uniformly in a mass proportion of 1:0.025-2.5:20-50 with reacting at 20-100° C. for 1-10 hours to obtain a reinforcing agent with a reactive group on its surface;
mixing a resin and a solvent uniformly in a mass proportion of 0.01-50:100 and are stirred for 1-60 minutes at a speed of 200-2000 rpm, so as to obtain a uniform and stable dispersion solution; and
dispersing the reinforcing agent with the reactive group on its surface, a bifunctional dispersing agent, a leveling agent, a film forming agent, a softening agent, and an antibacterial agent uniformly in the dispersion solution according to a mass proportion of 0.01-0.6:0.02-0.5:0.02-0.4:0.01-0.3:0.01-0.4:0.01-0.3, so as to obtain the multifunctional high-strength composite fabric coating agent;
wherein a step for preparing the reinforcing agent with the reactive group on its surface comprises:
adding a reinforcing agent, a synergist, and a solvent in a mass proportion of 1:0.025-2.5:20-50 to a reactor and reacting for 1-10 hours at 20-100° C., wherein after reaction products are cooled, solids therein are separated and are dried at room temperature for 10-30 hours, and then, milling and screening are performed;
wherein the synergist comprises a silane coupling agent and/or a polymer compound;
wherein the silane coupling agent comprises one or more combinations of 3-aminopropyltrimethoxysilane, γ-(2,3-epoxypropoxy) propyltriethoxysilane, γ-methylpropenyloxypropyltrimethoxysilane, N-(β-aminoethyl)-γ-aminopropyltriethoxysilane, anilinoisophorone, and γ-aminopropylmethyldiethoxy silane;
wherein the polymer compound comprises one or more combinations of polyvinyl alcohol, polyamide, polyacrylic acid, polymethylacrylic acid, polymaleic anhydride and copolymer of trans-butenedioic acid-propylene sulfonic acid.

2. The preparation method of claim 1, further comprising: mixing the resin and the solvent uniformly in a mass proportion of 0.01-50:100 and stirring them at a speed of 200-2000 rpm for 1-60 minutes, so as to obtain the uniform and stable dispersion solution.

\* \* \* \* \*